United States Patent
Baggott

(10) Patent No.: US 12,427,645 B2
(45) Date of Patent: Sep. 30, 2025

(54) APPARATUS, SYSTEM AND METHODOLOGY FOR IDENTIFYING SITE LOCATIONS WITHIN A CONSTRUCTION ENVIRONMENT

(71) Applicant: Brian Baggott, Surfside, FL (US)

(72) Inventor: Brian Baggott, Surfside, FL (US)

(*) Notice: Subject to any disclaimer, the term of this patent is extended or adjusted under 35 U.S.C. 154(b) by 887 days.

(21) Appl. No.: 17/668,466

(22) Filed: Feb. 10, 2022

(65) Prior Publication Data
US 2022/0266444 A1 Aug. 25, 2022

Related U.S. Application Data

(60) Provisional application No. 63/153,715, filed on Feb. 25, 2021.

(51) Int. Cl.
  *G01C 15/00* (2006.01)
  *B25H 7/04* (2006.01)
  *B43L 7/00* (2006.01)

(52) U.S. Cl.
  CPC ............. *B25H 7/04* (2013.01); *B43L 7/005* (2013.01); *G01C 15/004* (2013.01)

(58) Field of Classification Search
  CPC .. B25H 7/04; B25H 7/02; B43L 7/005; G01C 15/004
  See application file for complete search history.

(56) References Cited

U.S. PATENT DOCUMENTS

| | | | | |
|---|---|---|---|---|
| 2,919,913 A | * | 1/1960 | Phair | H02G 3/125 33/406 |
| 3,950,857 A | * | 4/1976 | Zanavich | B25H 7/00 33/528 |
| 4,793,069 A | * | 12/1988 | McDowell | H02G 1/00 D10/64 |
| 5,111,593 A | * | 5/1992 | Gehen, Sr. | H02G 1/00 33/DIG. 10 |
| 5,222,303 A | * | 6/1993 | Jardine | G01B 3/02 33/528 |
| 5,357,683 A | * | 10/1994 | Trevino | B25H 7/00 33/528 |
| 5,361,509 A | * | 11/1994 | Wheeler, Sr. | H02G 1/00 33/528 |
| 5,615,490 A | * | 4/1997 | Burchell | H02G 1/00 33/528 |
| 5,651,184 A | * | 7/1997 | Tutty | B25H 7/005 33/529 |
| 5,860,219 A | * | 1/1999 | Wilkinson | H02G 1/00 33/528 |
| 5,931,425 A | * | 8/1999 | Oliva | H02G 3/125 33/528 |

(Continued)

*Primary Examiner* — Yaritza Guadalupe-McCall
(74) *Attorney, Agent, or Firm* — Ryan, Mason & Lewis, LLP

(57) ABSTRACT

A system comprises at least one layout member configured to be mounted at a site where the layout member includes measurement graduations thereon and is configured to be marked with a marking implement and a template mounted to the layout member and selectively slidable along the layout member to a selected graduation corresponding to at least one coordinate of an installation site for installation of equipment. The template includes one or more apertures. The apertures permit passage of a marking implement to mark the at least one coordinate of the installation site on the layout member.

19 Claims, 7 Drawing Sheets

(56) References Cited

U.S. PATENT DOCUMENTS

| | | | | |
|---|---|---|---|---|
| 6,360,448 B1* | 3/2002 | Smyj | E04G 21/1891 | 33/562 |
| 6,834,438 B1* | 12/2004 | Heister | E04F 21/0076 | 33/526 |
| 6,857,197 B2* | 2/2005 | Hicks | H02G 1/00 | 33/528 |
| 6,907,674 B2* | 6/2005 | Grendahl | B43L 13/205 | 33/562 |
| 7,200,951 B2* | 4/2007 | O'Connor | H02G 1/00 | 33/528 |
| 7,296,360 B2 | 11/2007 | El-Katcha et al. | | |
| 7,373,730 B2* | 5/2008 | Murphy | H02G 1/00 | 33/528 |
| 7,373,731 B2* | 5/2008 | Nyberg | E04G 21/24 | 33/566 |
| 7,454,844 B1* | 11/2008 | Ruby | B26F 1/32 | 33/528 |
| 7,481,002 B2 | 1/2009 | Bascom et al. | | |
| 7,497,025 B2* | 3/2009 | Murray | H02G 1/00 | 33/528 |
| 7,533,473 B2* | 5/2009 | Chua | E04G 21/1891 | 33/759 |
| 7,659,479 B2* | 2/2010 | Murphy | H02G 3/123 | 33/528 |
| 7,685,734 B1* | 3/2010 | Burger | B25H 7/005 | 33/1 G |
| 7,845,089 B1* | 12/2010 | Lavalle | H02G 3/12 | 33/528 |
| 8,225,521 B1* | 7/2012 | Mooney | G01B 3/1003 | 33/759 |
| 8,307,562 B2 | 11/2012 | Bascom et al. | | |
| 8,943,704 B1* | 2/2015 | Scammel | B25H 7/04 | 33/528 |
| 10,035,257 B2* | 7/2018 | Darby | B25H 7/005 | |
| 10,809,407 B2* | 10/2020 | Hornby | B43K 29/08 | |
| 2002/0038518 A1* | 4/2002 | Barrows | E04G 21/1891 | 33/758 |
| 2002/0100180 A1* | 8/2002 | Montefusco | B43L 13/205 | 33/563 |
| 2005/0257391 A1* | 11/2005 | Driscoll | E04F 21/00 | 33/566 |
| 2006/0000102 A1* | 1/2006 | Lawson | G01B 3/14 | 33/562 |
| 2006/0265893 A1* | 11/2006 | Gifford | H02G 3/126 | 33/528 |
| 2008/0216337 A1* | 9/2008 | Chen | G01B 3/1003 | 33/759 |
| 2009/0277031 A1* | 11/2009 | Stocking | E04G 21/1841 | 33/562 |
| 2010/0095543 A1* | 4/2010 | Inthavong | H02G 1/00 | 33/528 |
| 2011/0154673 A1* | 6/2011 | Herth | G01B 3/14 | 33/562 |
| 2017/0066125 A1* | 3/2017 | Lostlen | B25H 7/02 | |
| 2022/0266444 A1* | 8/2022 | Baggott | B25H 7/02 | |

* cited by examiner

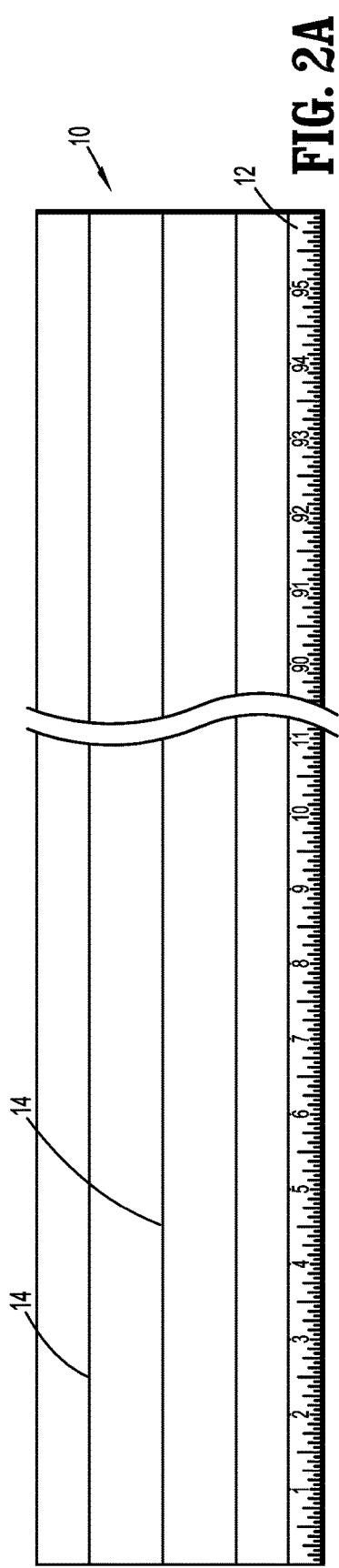
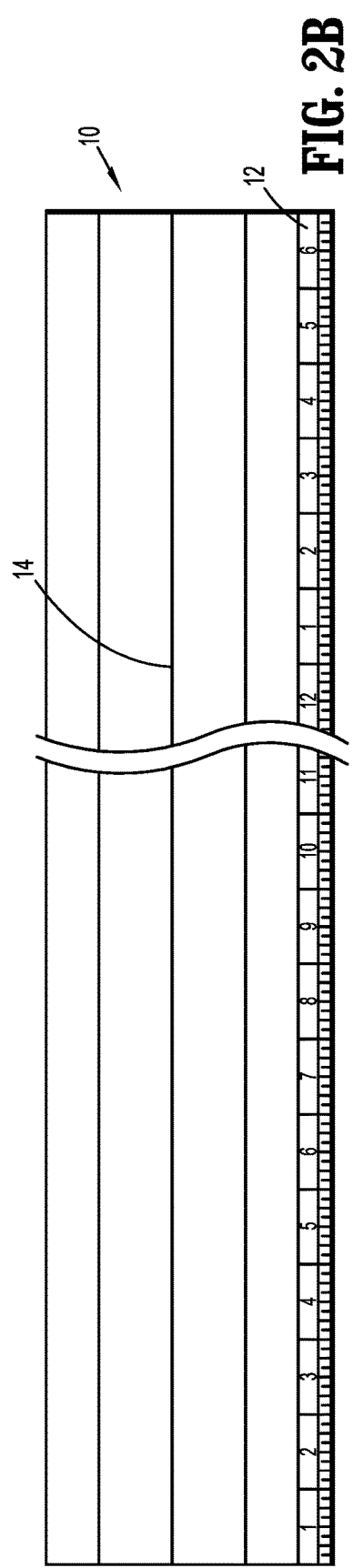
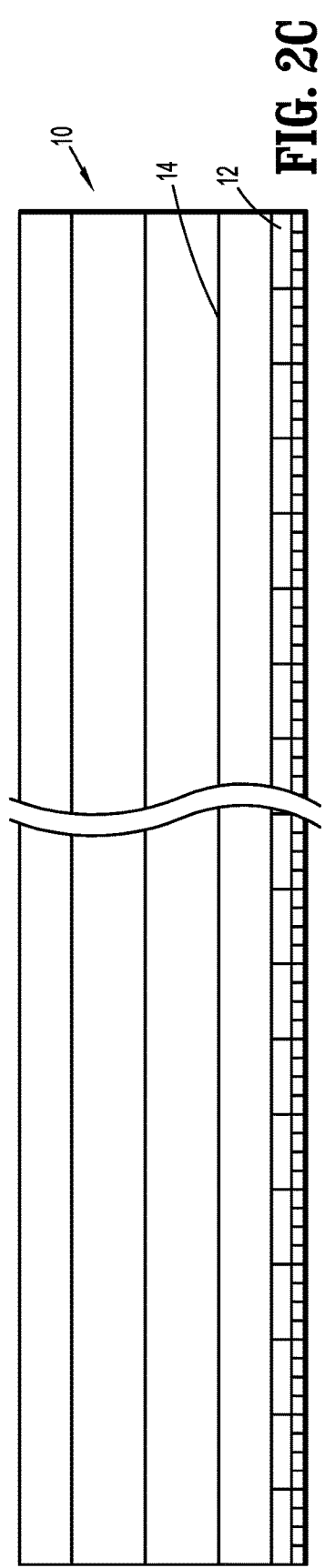
FIG. 2A
FIG. 2B
FIG. 2C

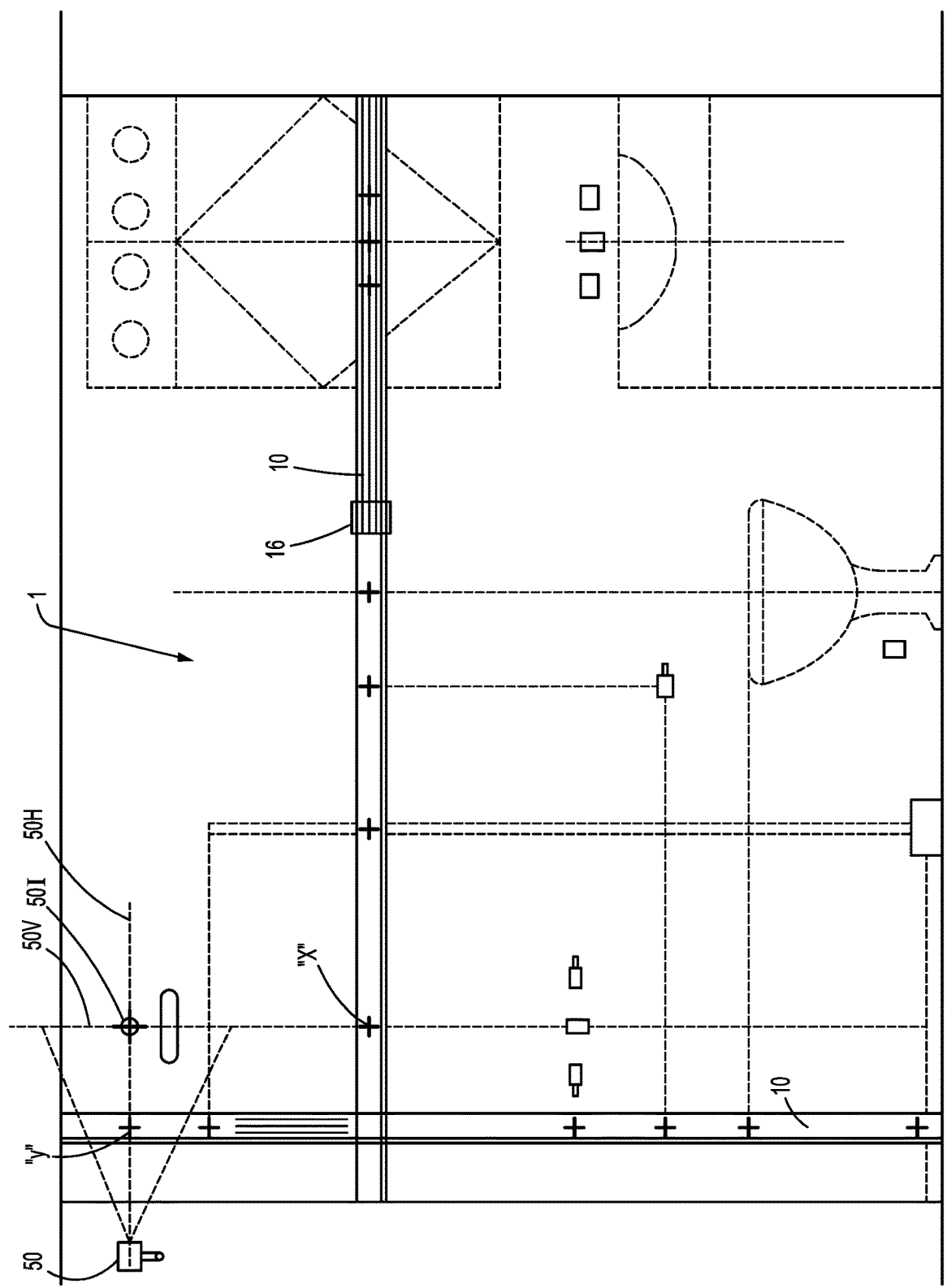

APPARATUS, SYSTEM AND METHODOLOGY FOR IDENTIFYING SITE LOCATIONS WITHIN A CONSTRUCTION ENVIRONMENT

BACKGROUND

The present disclosure relates to building construction, and, in particular, relates to a system and methodology for identifying site locations for precise installation of building equipment, materials, plumbing, electrical lines and other fixtures within a construction environment.

Conventional construction practices identify installation site locations for equipment by measuring and directly marking, with a marking implement, e.g., a pen or pencil, the framing, flooring, ceiling, etc. Some tradespeople couple or hold a marking board including lumber, board or plywood at the location and mark the board. Such practices, however, suffer from deficiencies including the potential misidentification of the installation site and other human error. Moreover, the markings are difficult to see on the knotted, grainy wooden background of the board often necessitating the use of a black permanent marking implement. A permanent mark, however, cannot be erased if any adjustments are needed thereby resulting in crossing out of the mark by the tradesperson, covering the mark with tape or utilizing a new wood board identifier. These conventional methodologies present other difficulties including requiring simultaneous manipulation of the tape measure and the marking implement which is often difficult with long measurements, particularly, by a single person. In addition, a combination square is required to make vertical and horizontal marks on the marker board. This presents difficulties in obtaining a straight marker line due to the rough edge of the marker board and by requiring the tradesperson to hold the marker board, combination square and marker all at the same time.

SUMMARY

Accordingly, the present invention obviates the disadvantages of conventional installation site practices. In accordance with one illustrative embodiment, a system for indicating installation sites for building materials, equipment, utilities, plumbing supplies, etc. includes at least first and second layout members each having a template mounted thereon. The layout members have graduations (similar to a tape measure) running along the length of the layout member. The template is movably mounted on the layout member to be selectively positioned at a desired graduation corresponding to the intended installation location of the equipment based on, e.g., callouts on the blue prints. The template includes one or more apertures to permit passage of the tip of the marking implement to mark the template at the desired location. In illustrative embodiments, the system utilizes a first or horizontal layout member and a second or vertical layout member. The template of the first layout member is moved along the first horizontal layout member (in the x-direction along an x-axis) to the desired horizontal location (x-coordinate) and the layout member is marked through an opening of the template with the marking implement. Then the template of the second layout member is moved along the second vertical layout member in the vertical (or y-direction along the y-axis) to the desired vertical location (y-coordinate) and the vertical layout member is marked through an opening of the template. The horizontal and vertical markings correspond to the "coordinates" (e.g., x, y coordinates) of the exact location as to where the equipment is to be installed in accordance with the blueprint. A laser, e.g., a cross-line laser is mounted adjacent the vertical layout member. The horizontal laser beam of the cross-line laser is aligned with the marking (corresponding to, e.g., the x-coordinate) on the vertical layout member. The vertical laser beam of the cross-line beam is aligned with the marking (corresponding to, e.g., the y-coordinate) on the horizontal layout member. The intersection of the horizontal laser beam and the vertical laser beam corresponds to the precise location of the site location for installation of the construction equipment. In one illustrative embodiment, the cross-beams of the laser are projected on a structural object including framing, walls and ceilings etc., and the tradesperson may mark the installation site on the structural object with a marking implement. In other illustrative embodiments, there may be no wall or ceiling to serve as a platform to mark the precise installation location. More specifically, the horizontal and vertical cross beams may intersect in space of the construction site, not necessarily along a wall or ceiling. The intersection of the beams indicates to the tradesperson the exact location of the installation site, e.g., the location of a shower head. Otherwise stated, this process provides the capability to mark in "thin air" intersection points of a cross-line laser thereby providing the tradesperson with a virtual or visual mark of the installation location. In addition, the cross-line beams in conjunction with the use of the layout members provide a three-dimensional (3D) view of one or more installation sites within the construction environment. These processes can be used to mark the location of anything to be installed in a construction environment.

In illustrative embodiments, a system comprises at least one layout member configured to be mounted at a site where the layout member includes measurement graduations thereon and is configured to be marked with a marking implement and a template mounted to the layout member and selectively slidable along the layout member to a selected graduation corresponding to at least one coordinate of an installation site for installation of equipment. The template includes one or more apertures. The apertures permit passage of a marking implement to mark the at least one coordinate of the installation site on the layout member.

In another illustrative embodiment, a system, comprises a first layout member configured to be mounted at a site and having measurement graduations thereon and being configured to be marked with a marking implement and a first template mounted to the first layout member and selectively slidable along the first layout member to a selected graduation corresponding to an x coordinate of an installation site for installation of equipment. The first template includes one or more apertures permitting passage of a marking implement to mark the x coordinate of the installation site on the layout member. The system further includes a second layout member configured to be mounted at the site and having measurement graduations thereon, and being configured to be marked with the marking implement and a second template mounted to the second layout member and selectively slidable along the first layout member to a selected graduation corresponding to a y coordinate of an installation site for installation of equipment. The second template including one or more apertures permitting passage of the marking implement to mark the y coordinate of the installation site on the second layout member.

In another illustrative embodiment, a method for identifying a targeted location within a site, comprises positioning first and second layout members relative to a site, each of the first and second layout members having measurement graduations extending therealong, moving a first template mounted to the first layout member to a position corresponding to a first coordinate of a target location within the site, forming a first mark, via the first template, on the first layout member at the first coordinate of the target location, moving a second template mounted to the second layout member to a position corresponding to a second coordinate of the target location within the site, forming a second mark, via the second template, on the second layout member at the second coordinate of the target location and utilizing the first and second marks to identify the target location.

BRIEF DESCRIPTION OF THE DRAWINGS

FIGS. 2A-2C illustrate several embodiments of the template in accordance with one or more illustrative embodiments of the present disclosure.

FIG. 5 is a schematic view illustrating use of the system including first and second layout members and associated templates in installing equipment in a construction environment in accordance with one or more illustrative embodiments of the present disclosure.

DESCRIPTION

Referring now to FIGS. 1-4, the system and methodology of the present invention will be described. In general, the system includes at least one or more layout elements or layout members (hereinafter, referred to as "layout members"") which are used in combination with a laser device such as a cross-line laser to assist personnel to precisely identify location sites in an environment. In illustrative embodiments, the system and methodology may be used by contractors, professionals, home owners or any other individual or entity in precisely marking installation sites for construction equipment. Such construction equipment includes, but is not limited to, plumbing components, fixtures, cabinets, HVAC equipment, electrical lines and boxes, lighting, ductwork, tiles, stone work, flooring, ceilings, columns, beams, piping, gas lines etc. The system may be used in new construction, or in remodeling, and has application in both commercial and residential settings. Although the system and methodology will be described in use of the system by contractors in installing construction equipment, it is appreciated that the system may have application in many settings in which the identification of a precise location within any indoor or outdoor environment is required.

Figure 1:
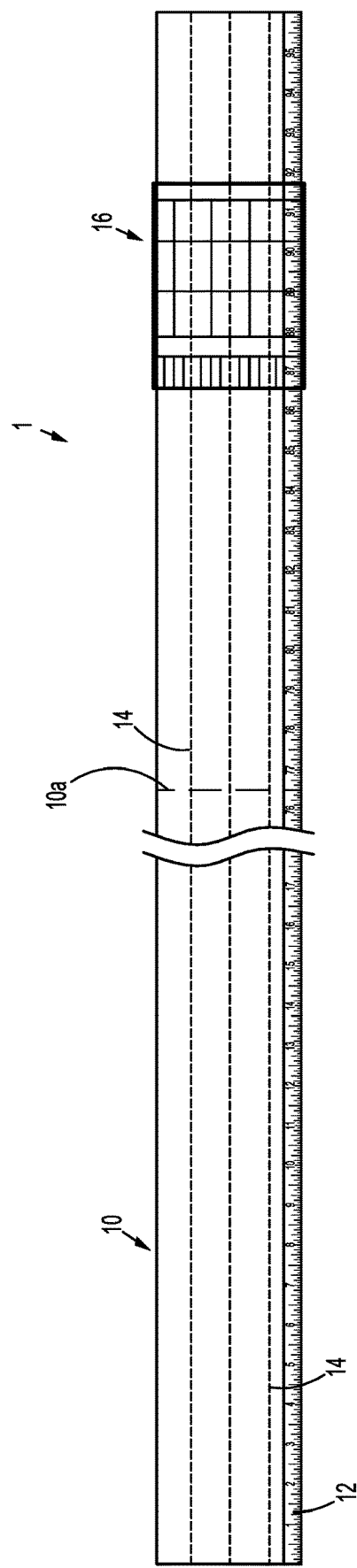
FIG. 1 illustrates a plan view of a single layout member and mounted template of the system in accordance with one or more illustrative embodiments of the present disclosure.

FIG. 1 illustrates one layout member of the system 1 of the present invention. The layout member 10 is an elongated element of predetermined length, e.g., eight feet (8') long. The width of the layout member 10 may be about four (4) inches. The thickness of the layout member 10 may be about ⅛ inch. The layout member 10 is not limited to these dimensions, i.e., other dimensions of the layout member are also contemplated. The layout member 10 may be fabricated from Masonite or other suitable material and may be markable with a marking implement, including a permanent marker, a temporary marker, a pen or a pencil. The edges of the layout member 10 are straight. In illustrative embodiments, the layout member 10 is in the form of a white dry erase board capable of being marked with the marking implement, whereby the markings may be subsequently removed with an eraser including a cloth or the like. The white dry erase background makes black marks very clear and visible even in a relatively dark environment. The layout member 10 is contemplated to be reusable, and may be cleaned with any cleaning solution. In illustrative embodiments, the layout member 10 may include one or more hinges 10a, and may be folded along its hinges for storage or transport. For example, the layout member 10 may be folded and shipped in a 20"×20"×4" box. The layout member 10 may be formed to any predetermined size depending on the application.

A first section, e.g., lower section 12, of the layout member 10 has graduations along its length similar, e.g., to a ruler or tape measure. FIGS. 2A-2C illustrate several options of graduations of the layout member 10. FIG. 2A illustrates a first option in which the graduations include one (1) inch increments (with 1/16 sub-graduations) continuously running along the length of the layout member 12 from one (1) to ninety-six (96) inches. FIG. 2B illustrates a second option in which one (1) inch increments (with ⅛ sub-graduations) repeat every twelve (12) inches along the length of the layout member. FIG. 2C illustrates a third option in which one (1) inch boxes repeat along the length of the layout member with each box having ¼, ½, and ¾ inch graduations. In an illustrative embodiment, the boxes may be devoid of graduations. For example, it is contemplated that the boxes could be marked by a tradesman at the construction site. Other arrangements of the graduations are also envisioned including a metric graduation scale having meter, centimeters and/or millimeters graduations, etc.

As best depicted in FIGS. 1 and 2A-2C, the layout member 10 may include one or more parallel lines 14 extending the length of the layout member. The parallel lines 14 are designated or associated with the type of equipment to be installed at the construction site. Or, in alternative embodiments, may be designated to a particular tradesman. Three lines are shown in FIG. 1 although the number of lines 14 may vary and include more or less than three (3) lines. The function of the parallel lines 14 will be discussed hereinbelow.

Figure 4:
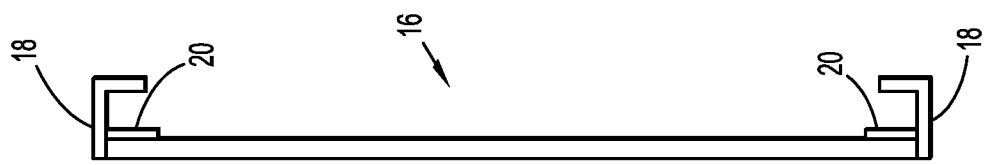
FIG. 4 is a side view of the template of FIG. 3 in accordance with one or more illustrative embodiments of the present disclosure.
Figure 3:
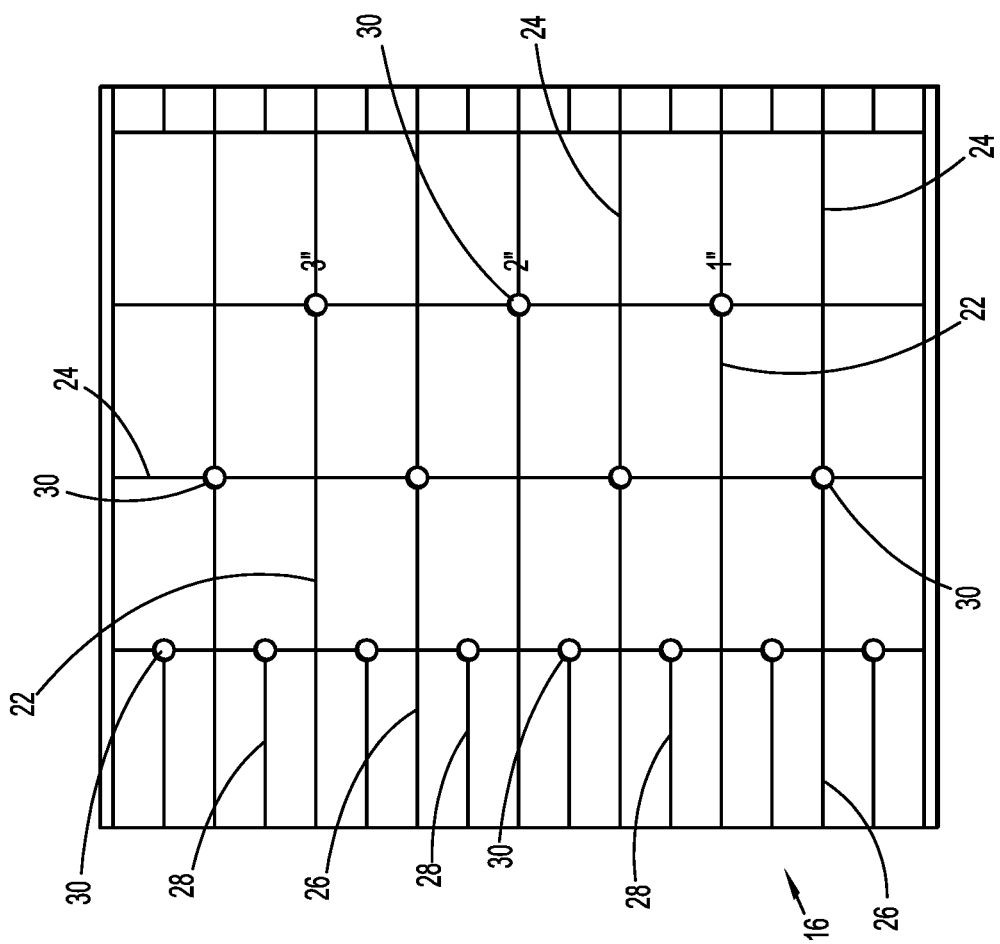
FIG. 3 is a plan view of a template of the system in accordance with one or more illustrative embodiments of the present disclosure.

Referring now to FIGS. 1, 3 and 4, a template 16 is coupled to layout member 10, and is slidable along the layout member 10 to any position along its length. FIG. 3 is a plan view of the template 16 and FIG. 4 is a side view of the template 16. Any means for slidably mounting the template 16 to the layout member 10 are envisioned including, without limitation, a tongue and groove arrangement or a rail arrangement. In one illustrative embodiment, the template 16 includes edges 18 which snap fit over the edges of the layout member 10 to couple the template 16 to the layout member 10 in slidable relation therewith. The edges 18 may be L-shaped as shown although other configurations are also envisioned. The template 16 further may include spacers 20 adjacent the edges 18 to maintain the face of the template 16 in spaced relation relative to the layout member 10. The spacers 20 facilitate sliding movement of the template 16 via, e.g., reducing surface contact, along the layout member 10. The spacers 20 are dimensioned at a desired depth to displace the face of the template 16 relative to the layout member 10 to ensure that any temporary markings on the layout member 10 are not subject to smearing during sliding of the template 16. The spacers 20 may have a thickness or depth of about 1/16 inch. The template 16 may be of plexiglass or any other suitable material including other plastic materials, and in some embodiments, may be clear to enable visualization of the temporary markings and/or the graduations on the layout member 10 through the template 16. The length and height of the template 16 generally corresponds to the dimensions of the layout member 10. In illustrative embodiments, the length and width are four (4) inches and four and a quarter (4¼) inch, respectively. The edges of the template 16 are linear and enable use of the template 16 as a tool for making linear marks, including 90° marks, on the layout member 10.

As best depicted in FIG. 3, the template 16 has both horizontal and vertical measurement or reference lines 22, 24 in predetermined intervals, e.g., in inch increments and sub inch increments. In illustrative embodiments, at least some of the horizontal lines 22 are disposed every ½ inch (lines 26) and/or every ¼ inch interval (lines 28). Other increments are also envisioned. The template 16 further includes holes 30 at predetermined locations along the lines 22, 24, e.g., at one (1) inch, one-half (½) inch and one quarter (¼) inch intervals. Other intervals are also envisioned. The holes 30 are predrilled, and permit passage of a marking implement to enable the tradesman to mark the layout member 10 through a particular hole in the template 16 at, e.g., the desired installation site. The number of holes 30 positioned about the template 16 provides flexibility to the tradesperson, and facilitates use of the system in marking the layout member 10 at various locations corresponding to the installation site.

FIG. 5 illustrates use of the system in installing fixtures, e.g., in a bathroom. Initially, a first or horizontal layout member 10 and a second or vertical layout member 10 are each positioned, e.g., against a wall or framing. In illustrative embodiments, the layout members 10 may be coupled to the framing via screws, fasteners, Velcro™ or the like. The horizontal layout member 10 may run from wall to wall or between framing studs. The vertical layout member 10 may run from floor to ceiling. The tradesperson will confirm that the horizontal layout member 10 is level and that the vertical layout member 10 is at a right angle with respect to the floor and with respect to the horizontal layout member 10. Thereafter, the tradesperson obtains the location of, e.g., a shower head through via review of, e.g., blueprints, of the construction site. The blueprints indicate that the shower head is to be installed at a certain location with respect to the left wall, right wall or any other x reference structure (e.g., an x location) and with respect to the floor or a y reference structure (e.g., a y location). In one illustrative embodiment, the blueprints indicate that the shower head is to be positioned at a location x, e.g., 2 feet and 6 inches from the left wall (x coordinate) and location y, e.g., six feet and six inches from the floor (y coordinate). The tradesperson then slides the template 16 mounted to the horizontal layout member 10 to a position adjacent the thirty-inch (30") graduation on the horizontal layout member 10. The tip of the marking implement is inserted in an opening 30 of the template 16 to mark the horizontal layout member 10 at this x coordinate ("x") or "x center-line" in line with the center of the shower head. The template 16 mounted to the vertical layout member 10 is slid along the vertical layout member 10 and positioned adjacent the seventy-eighth inch (78") graduation. The vertical layout member 10 is marked at this y coordinate ("y") or "y center-line" in line with the center of the shower head. Thereafter, a cross-line laser 50 is activated. Any commercially available cross-line laser may be used including, e.g., and without limitation, the DEWALT Line Laser, Self-Leveling, Cross Line, Red Beam, manufactured by DEWALT of Towson, Maryland, the Milwaukee M12™ Green Cross Line and Plumb Points Laser, manufactured by Milwaukee Tool of Brookfield, Wisconsin or any other conventional cross-line laser. Cross-line lasers are described in U.S. Pat. Nos. 7,481,002, 8,307,562 and 7,296,360, each of which are incorporated by reference herein. The cross-line laser 50 is configured to project intersecting horizontal and vertical beams. The cross-line laser 50 may be mounted on a base which enables angular rotation of the cross-line laser 50 to adjust positioning of either or both of the projected beams. The cross-line laser 50 is selectively manipulated such that the projected horizontal beam 50H of the cross-line laser is aligned with the "y" marking on the vertical layout member 10 and the projected vertical beam 50Y of the laser is aligned with the "x" marking on the horizontal layout member 10. In illustrative embodiments, the cross-line laser 50 may be mounted on a tripod or other support structure providing selective vertical adjustment of the vertical location of the laser 50. For example, and without limitation, in one illustrative embodiment, the cross-line laser 50 may be aligned with the x coordinate whereby the projected vertical beam 50V extends along the x coordinate. The horizontal beam 50H may be manipulated by rotating the cross-line laser 50 relative to its base to align the projected horizontal line with the y coordinate. The location where the horizontal beam 50H and the vertical beam 50Y intersect (e.g., at the cross-line) thus corresponds to the precise location (x coordinate, y coordinate) for installation of the shower head. This location 50I corresponding to the point of intersection of the horizontal and vertical beams 50H, 50Y can be marked by the tradesman with a pencil or pen marking, or any other implement including, without limitation, chalk, a felt marker, etc. The marking provides an indicator of the installation location 50I for the tradesman. In other illustrative embodiments, the intersection of the horizontal and vertical beams 50H, 50Y may occur in space indicating an installation location 50I in space, e.g., an interior space, to position a structure such as piping, electric wires etc. The shower head piping is mounted at the indicator marking by the tradesperson. This process may be repeated to install the shower handle, toilet and toilet handle, cabinetry, sink etc. by reference to the blueprints and marking the horizontal and vertical layout member 10 at the appropriate center line locations (e.g., x and y coordinates) detailed in the prints for each equipment.

In other illustrative embodiments any light emitting device may be substituted for the cross-line laser 50 including a device which projects a single linear light line.

Figure 6:
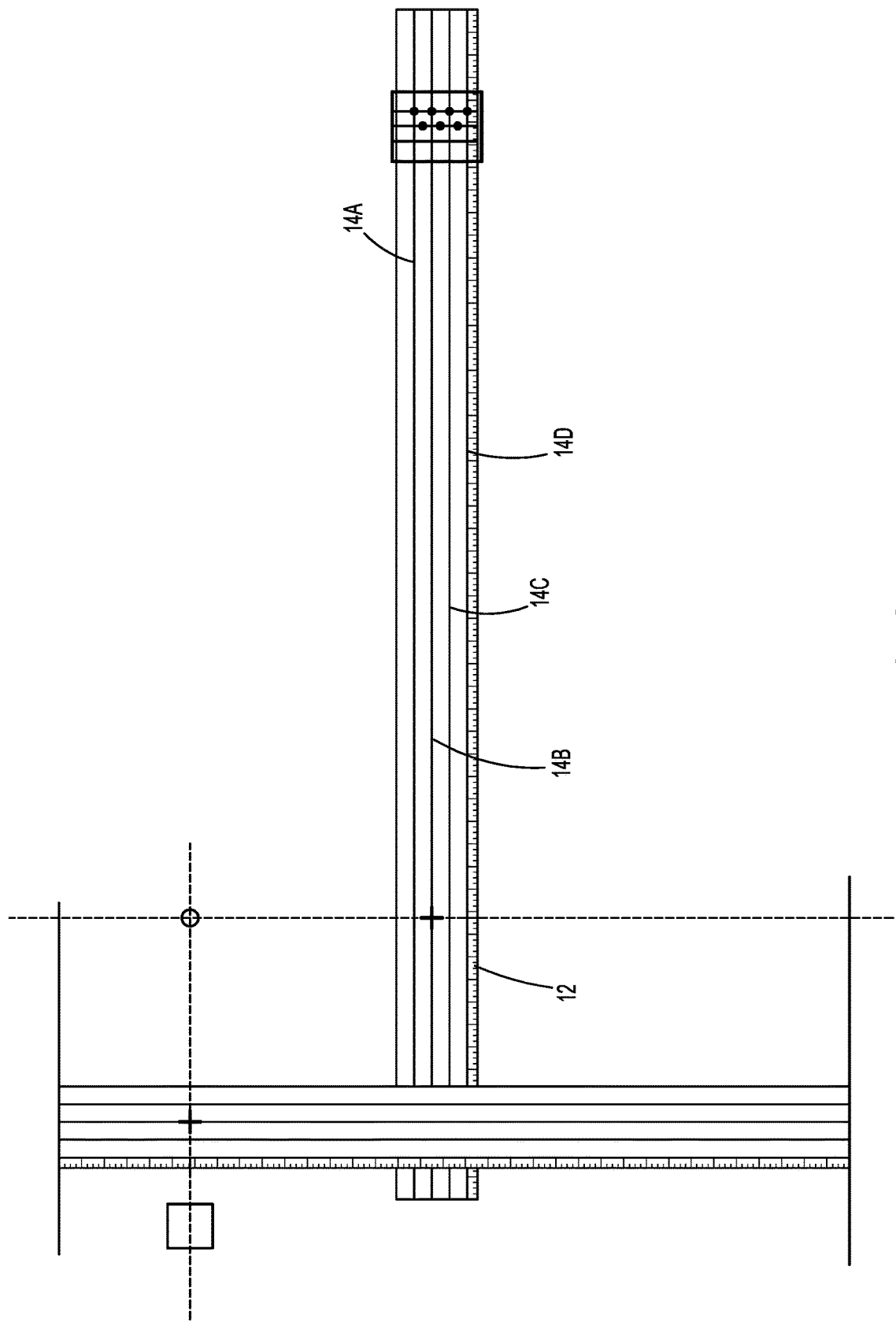
FIG. 6 is a view illustrating use of the first and second layout members and templates of the system to project a cross-line laser beam to identify a targeted location site in accordance with one or more illustrative embodiments of the present disclosure.

FIG. 6 illustrates use of the system similar to the manner described in FIG. 5. In FIG. 6, the parallel lines 14 on the horizontal and vertical layout members 10 are depicted and are inclusive of lines 14A, 14B, 14C and 14D as one example positioned above the graduations of the lower end of the layout member. Each line 14A-14D corresponds to a supply-type or tradesperson. For example, line 14A may correspond to HVAC equipment to be installed by an HVAC contractor, line 14B may correspond to plumbing supplies to be installed by a plumbing contractor, line 14C may correspond to tile or flooring to be installed by a flooring contractor and line 14D may correspond to electrical equipment to be installed by an electrician. Thus, each tradesperson is designated a specific line 14A-14D on the horizontal and vertical layout members for placement of their markings associated with the installation of their respective equipment. For example, the plumbing contractor will make all of his/her marks for installation of plumbing equipment on line 14B while the electrical contractor will make all of his/her markings on line 14D. As discussed hereinabove with FIG. 3, the template 16 is be provided with openings 30 which respectively align with the lines 14A-14D to provide for insertion of the marking pen and marking the center line of the appropriate line 14A-14D. These features enable use of the pair of horizontal and vertical layout members 10 by multiple tradespersons in an organized and structured manner. Other arrangements are also envisioned. For example, line 14A could be assigned to all the major equipment, cabinets, bath tubs, vanity showers, toilets, sinks and appliances just to name a few. Line 14B may be assigned to mark the center line of all the plumbing equipment, the center line of shower, mixing values, toilet values, rough ins, etc. Line 14C may be used to mark the centerlines of tiles, stones and other masonry work. Line 14D could be assigned to mark the center lines of electrical work, lights, outlets, etc. Other arrangements are also envisioned.

Figure 7:
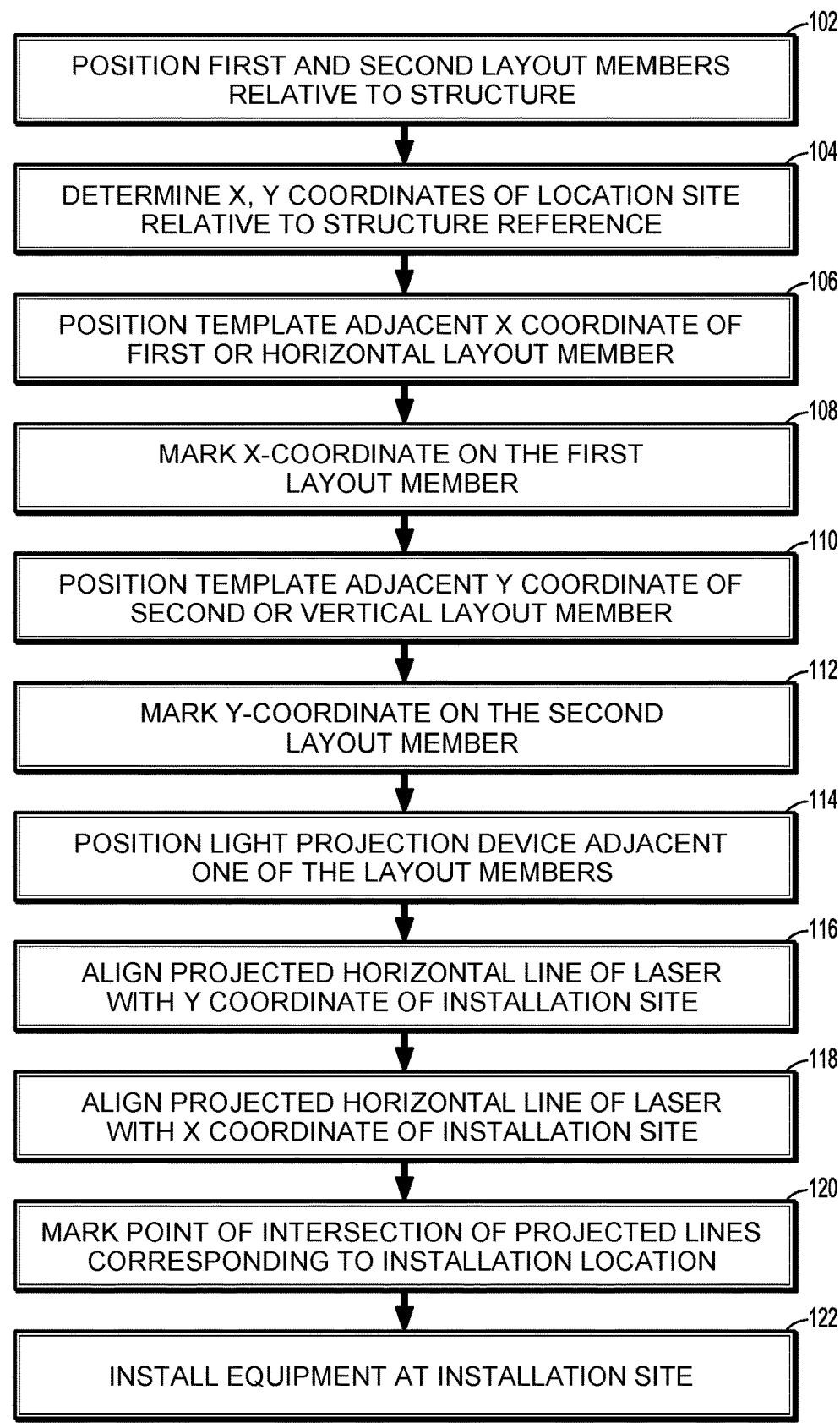
FIG. 7 is a flow chart illustrating use of the system in obtaining installation locations in an environment in accordance with one or more illustrative embodiments of the present disclosure.

FIG. 7 is a flow chart further depicting the use of the system 1 in accordance with providing indicators at various location sites to assist an entity, e.g., a tradesperson or the like in a construction environment. The flow chart depicts an identification process 100 for, e.g., an installation location, having various steps. It is appreciated that the steps may be optional, performed in a different sequence(s) and/or be performed simultaneously. Other steps are also possible. In STEP 102, one or more layout members 10, for example, first and second layout members 10 (which may be horizontal and vertical layout member 10) are positioned relative to a structure. As noted hereinabove, the structure may be a wall, floor, ceiling and/or framing, an interior space, an exterior space, etc. The layout members 10 may be mounted, e.g., releasably mounted, to the structure via fasteners, adhesives or any other methodology envisioned by one skilled in the art. In illustrative embodiments, the layout members 10 may be simply positioned relative to the structure without being secured to the structure. One layout member may be, e.g., a horizontal layout member 10 and the other layout member may be, e.g., a vertical layout member 10. The layout members 10 may or may not overlap each other. For example, the vertical layout member 10 may be displaced relative to the horizontal layout member 10. With the layout members 10 positioned relative to the structure, the (x, y) coordinates of a location site, e.g., an installation location for installing a piece of equipment, relative to the reference within the structure or environment is determined by the tradesperson. (STEP 104). The (x, y) coordinates may be determined via blueprints, visual graphics provided by any computer, personal digital assistant (PDA) and/or handheld phone. The reference may be a wall, ceiling, column, stud or any other reference within the structure. In STEP 106, the tradesperson slides the template 16 along, e.g., the first or horizontal layout member 10 to a position corresponding to the x coordinate of the referenced installation site. Utilizing a marking instrument, the implement is introduced within one of the openings 30 in the template 16 in alignment with, or most adjacent to, the precise x coordinate of the location site and the horizontal layout member is marked. (STEP 108). In STEP 110, the process is continued by sliding the template 16 on the second or vertical layout member 10, the tradesperson slides the template 16 along, e.g., the second or vertical layout member 10 to a position corresponding to the y coordinate of the installation site. (STEP 110) Utilizing the marking instrument, the implement is introduced within one of the openings 30 in the template 16 in alignment with, or most adjacent to, the precise y coordinate of the location site and the second layout member 10 is marked. (STEP 112). The templates 16 may be moved along their respective layout members 10 and displaced from the respective coordinate (x, y) locations. Thereafter, a light projecting device such as a laser tool or cross-line laser is positioned relative to at least one of the first and second layout members. (STEP 114). The laser is activated and the projected horizontal line of the laser is aligned with the y coordinate of the installation site (STEP 116) and the vertical line of the laser is aligned with the x coordinate of the installation site. (STEP 118) to obtain the precise location of the installation site at the intersection of the horizontal and vertical lines. The installation site is noted, e.g., marked by the tradesperson, on the wall, stud, floor etc. (STEP 120). Optionally, the equipment is installed at the referenced installation site. (STEP 122). STEP 114-122 may be repeated to identify other installation sites and install additional equipment.

Another exemplative use of the system is described as follows:

1. One or more layout members are attached horizontally along the entire length of a bathroom. On line 14A mark the center line location of the following, finish walls, toilet, bidet, vanity, showers, tubs, cabinets, etc. On line 14B mark the center line of all the plumbing fixtures. On line 14C mark the location all the tiles and stone work. On line 14D mark the location of all the electrical, GFI, lights, switch, sconces, etc.

2. Attach one or more layout members 10 vertically from floor to ceiling in the bathroom. On line 14A mark the center line heights of the, floor, ceiling, vanity, toilet, shower, tubs, cabinets, etc. On line 14B mark the heights of the center line of all the plumbing fixtures. On line 14C mark the location of all tile and stone work. On line 14D mark location of all electrical.

3. Mount a conventional cross-line laser with a vertical and horizontal beam where the laser may be adjusted up and down. Line the laser's horizontal beam with the center line mark "x" of the equipment on the vertical layout member 10, e.g., the center line of the shower head. Then line the laser's vertical beam with the center line mark "y" on the horizontal layout member 10, specifically, the center line of shower head. Where the laser vertical and horizontal beam cross intersect each other is called the cross-line. The cross-line will be the location of the shower head. As noted, there may be no wall between the studs to make a mark for the shower head. However, the laser cross-line will show the plumber in this case exactly where he needs to stub out his pipe.

4. This process can be used to mark the location of anything that's going to be installed in a room. It gives the tradesperson a visual mark in an area that has no platform to mark a location. A marking can be made in thin air with the cross-line laser. Blue prints are drawn in two dimensions (2D), having a plan drawing which is a floor plan (looking down) and a section drawing which is a vertical section, looking from floor to ceiling. The horizontal layout member 10 depicts the location of the floor plan and the vertical layout member 10 depicts the section plan. When both markings are lined up with the laser, the cross-line laser depicts a three-dimensional (3D) picture of the room or construction site. This enhances visualization of the construction site for the tradesperson, thereby minimizing the potential for improper installation of the equipment and the undesired cascading affect it has on subsequent installers who may use the improperly located equipment as a reference for their installation.

Other illustrative uses of the system include the following. In construction of a new building, multiple vertical layout members may be attached end to end from the basement to the top of building. Using, e.g., option 2 of the layout member 10 (FIG. 2B), foot markings may be added to the layout members 10 at every elevation. Negative foot markings may be used on the layout members below grade. The vertical layout members 10 provide a visual of the elevations of the building. Moreover, the vertical layout members may be marked from the basement moving up from floor to floor to the roof of the building. This process depicts the following:

1. Below grade work, septic tanks heights.
2. Heights of footing, rebar, drainage and pipe pitches, basement floor, finish floor, etc.
3. Heights of beams, columns, floor slabs, ceilings, etc.
4. Height of the top of the building.

In addition, the layout members 10 may be used when laying out a mechanical room that has a number of expensive components and space constraints. Two rows of layout members may be used to mark all the equipment in the room. For example, a horizontal layout member 10 may be positioned five feet (5') off the floor. This establishes a bench line from which to measure. Any equipment that cannot be moved is marked on the horizontal and vertical layout members 10 with x and y center line marks. Examples of such equipment include the main water line, and gas and electrical lines that come from outside the building. The center line locations of electrical equipment and the plumbing components are marked on the layout members s and so forth for all the trades. Using the cross-line laser, the laser's horizontal beam is aligned with the markings on the vertical layout member and the laser's vertical beam with the markings on the horizontal layout member. The lasers crossline provide the exact location of anything in the room. These processes may be repeated for each floor in the building.

Figure 8:
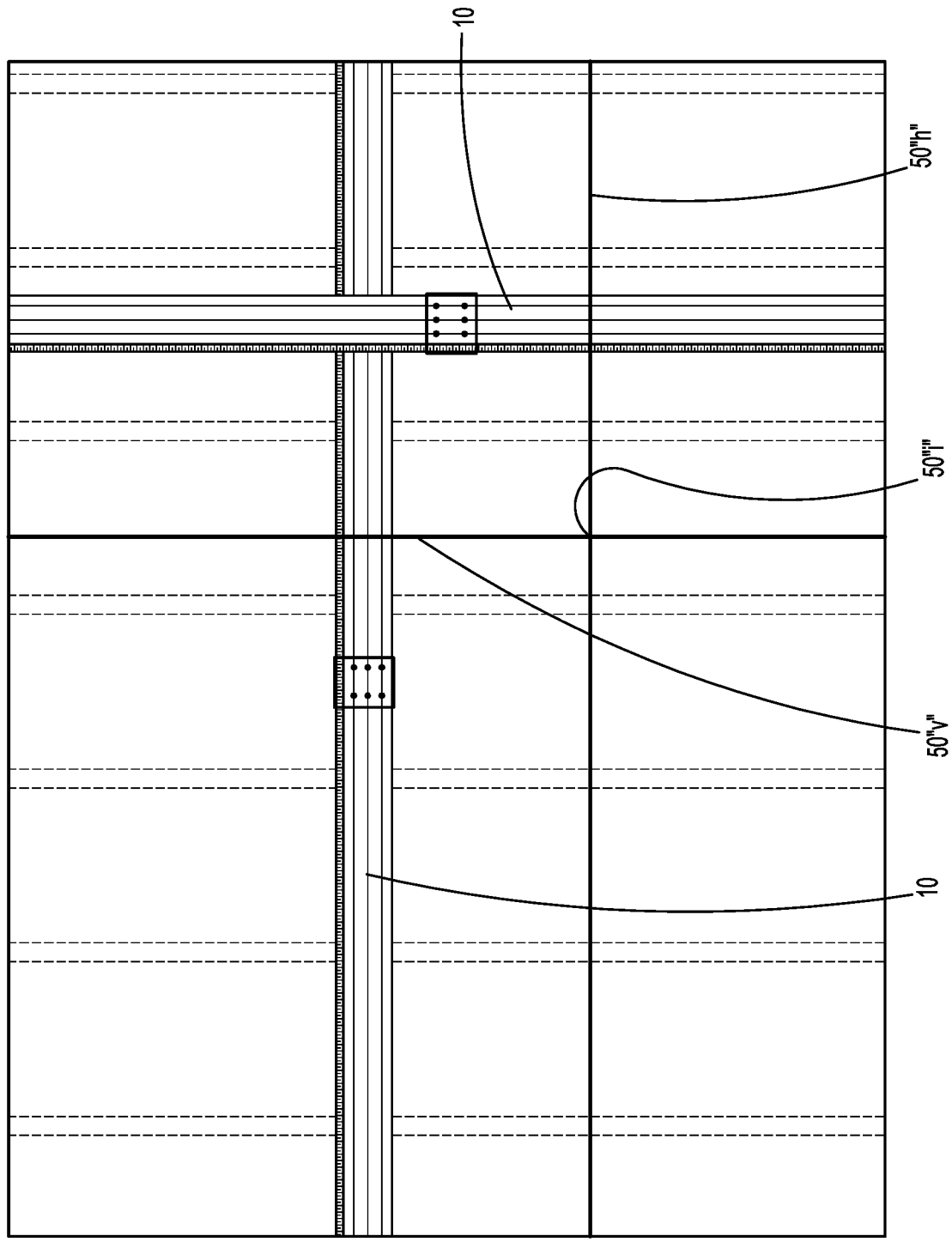
FIG. 8 is a view illustrating another use of the first and second layout members and templates of the system to project a cross-line laser beam to identify a targeted location site in accordance with one or more illustrative embodiments of the present disclosure.

FIG. 8 further illustrates use of the horizontal and vertical layout members 10 in conjunction with a cross-line laser. As depicted, the vertical beam "50V" of the laser is aligned with the marking on the horizontal layout member 10 and the horizontal beam "50H" of the cross-line laser is aligned with the vertical marking on the vertical layout member 10. The point of intersection "50I" of the vertical and horizontal beams "50H, 50V" corresponds to the center line for installation of the piece of equipment.

In other illustrative embodiments, a system comprises at least one layout member configured to be mounted at a site where the layout member includes measurement graduations thereon and is configured to be marked with a marking implement and a template mounted to the layout member and selectively slidable along the layout member to a selected graduation corresponding to at least one coordinate of an installation site for installation of equipment. The template includes one or more apertures. The apertures permit passage of a marking implement to mark the at least one coordinate of the installation site on the layout member.

The system may comprise a first layout member having a first template slidably mounted thereto and a second layout member having a second template slidably mounted thereto.

The first layout member may be a horizontal layout member and the second layout member may be a vertical layout member.

Each of the first and second templates may include the one or more apertures. The one or more apertures of the first template enables marking of a first coordinate of the installation site on the first layout member and the one or more apertures of the second template enables marking of a second coordinate of the installation site on the second layout member.

Each of the first and second templates may include a plurality of apertures spaced about the respective first and second templates.

At least some of the apertures of the first and second templates may be spaced at defined increments relative to each other.

The first and second templates each may include one or more template reference lines.

The one or more reference lines of the first and second templates may comprise graduation markings.

The one or more reference lines may include horizontal and vertical lines.

The one or more apertures may be in alignment with at least some of the one or more reference lines.

The system may include a light emitting member configured to illuminate one or more reference lines.

In other illustrative embodiments, a system comprises a first layout member configured to be mounted at a site and having measurement graduations thereon and being configured to be marked with a marking implement and a first template mounted to the first layout member and selectively slidable along the first layout member to a selected graduation corresponding to an x coordinate of an installation site for installation of equipment. The first template includes one or more apertures permitting passage of a marking implement to mark the x coordinate of the installation site on the first layout member. The system further includes a second layout member configured to be mounted at the site and having measurement graduations thereon, and being configured to be marked with the marking implement and a second template mounted to the second layout member and selectively slidable along the first layout member to a selected graduation corresponding to a y coordinate of an installation site for installation of equipment. The second template including one or more apertures permitting passage of the marking implement to mark the y coordinate of the installation site on the second layout member.

The system further may include a light emitting member configured to generate one or more lines in general alignment with the x coordinate and the y coordinate whereby the intersection wherein the one or more lines corresponds to the installation site.

In another illustrative embodiment, a method for identifying a targeted location within a site, comprises: positioning first and second layout members relative to a site, each of the first and second layout members having measurement graduations extending therealong, moving a first template mounted to the first layout member to a position corresponding to a first coordinate of a target location within the site, forming a first mark, via the first template, on the first layout member at the first coordinate of the target location, moving a second template mounted to the second layout member to a position corresponding to a second coordinate of the target location within the site, forming a second mark, via the second template, on the second layout member at the second coordinate of the target location and utilizing the first and second marks to identify the target location.

Moving the first member may include referencing the graduations on the first layout member to position the first template with respect to the first coordinate of the target location and moving the second member may include referencing the graduations on the second layout member to position the second template with respect to the second coordinate of the target location.

Forming a first mark may include introducing a marking instrument through one or more apertures extending through the first template and marking the first layout member at the first coordinate of the target location.

Forming a second mark may include introducing a marking instrument through one or more apertures extending through the second template and marking the second layout member at the second coordinate of the target location.

Utilizing the first and second marks to identify the target location may include extending a first site line along the first coordinate and a second site line along the second coordinate and wherein an area of intersection of the first site line and the second site line corresponds to the target location.

Extending the first and second lines is performed with a light emitting device.

The light emitting device may include a cross-line laser.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system comprising:
a first layout member having a first template slidably mounted thereto configured to be mounted at a site, the first layout member including measurement graduations thereon, the layout member configured to be marked with a marking implement;
a first template mounted to the first layout member and selectively slidable along the first layout member to a selected graduation corresponding to at least one coordinate of an installation site for installation of equipment, the first template including one or more apertures, the apertures permitting passage of a marking implement to mark the at least one coordinate of the installation site on the first layout member; and
a second layout member having a second template slidably mounted thereto.

2. The system according to claim 1, wherein the first layout member is a horizontal layout member and the second layout member is a vertical layout member.

3. The system according to claim 2, including a light emitting member configured to illuminate a reference line.

4. The system according to claim 1, wherein each of the first and second templates includes the one or more apertures, the one or more apertures of the first template enabling marking of a first coordinate of the installation site on the first layout member, the one or more apertures of the second template enabling marking of a second coordinate of the installation site on the second layout member.

5. The system according to claim 4, wherein each of the first and second templates includes a plurality of apertures spaced about the respective first and second templates.

6. The system according to claim 5, wherein at least some of the apertures of the first and second templates are spaced at defined increments relative to each other.

7. The system according to claim 6, wherein the first and second templates each include one or more template reference lines.

8. The system according to claim 7, wherein the one or more template reference lines of the first and second templates comprise graduation markings.

9. The system according to claim 8, wherein the one or more template reference lines include horizontal and vertical lines.

10. The system according to claim 9, wherein the one or more apertures are in alignment with at least some of the one or more template reference lines.

11. A system, comprising:
a first layout member configured to be mounted at a site, the first layout member including measurement graduations thereon, the first layout member configured to be marked with a marking implement;
a first template mounted to the first layout member and selectively slidable along the first layout member to a selected graduation corresponding to an x coordinate of an installation site for installation of equipment, the first template including one or more apertures, the apertures permitting passage of a marking implement to mark the x coordinate of the installation site on the first layout member;
a second layout member configured to be mounted at a site, the second layout member including measurement graduations thereon, the second layout member configured to be marked with a marking implement; and
a second template mounted to the second layout member and selectively slidable along the second layout member to a selected graduation corresponding to a y coordinate of an installation site for installation of equipment, the second template including one or more apertures, the apertures permitting passage of a marking implement to mark the y coordinate of the installation site on the second layout member.

12. The system according to claim 11, further including a light emitting member configured to generate one or more lines in general alignment with the x coordinate and the y coordinate whereby the intersection of the one or more lines corresponds to the installation site.

13. A method for identifying a targeted location within a site, comprising:
positioning first and second layout members relative to a site, each of the first and second layout members having measurement graduations extending therealong;
moving a first template mounted to the first layout member to a position corresponding to a first coordinate of a target location within the site;
forming a first mark, via the first template, on the first layout member at the first coordinate of the target location;
moving a second template mounted to the second layout member to a position corresponding to a second coordinate of the target location within the site;
forming a second mark, via the second template, on the second layout member at the second coordinate of the target location; and utilizing the first and second marks to identify the target location.

14. The method according to claim 13, wherein:
moving the first layout member includes referencing the graduations on the first layout member to position the first template with respect to the second coordinate of the target location; and
moving the second layout member includes referencing the graduations on the second layout member to position the second template with respect to the second coordinate of the target location.

15. The method according to claim 14, wherein forming a first mark includes introducing a marking instrument through one or more apertures extending through the first template and marking the first layout member at the first coordinate of the target location.

16. The method according to claim 15, wherein forming a second mark includes introducing a marking instrument through one or more apertures extending through the second template and marking the second layout member at the second coordinate of the target location.

17. The method according to claim 16, wherein utilizing the first and second marks to identify the target location includes extending a first site line along the first coordinate and a second site line along the second coordinate and wherein an area of intersection of the first site line and the second site line corresponds to the target location.

18. The method according to claim 17, wherein extending the first and second site lines is performed with a light emitting device.

19. The method according to claim 18, wherein the light emitting device includes a cross-line laser.

* * * * *